Jan. 10, 1950 C. A. BROWN 2,493,736
SHAFTLESS BUTTERFLY VALVE
Filed April 5, 1946
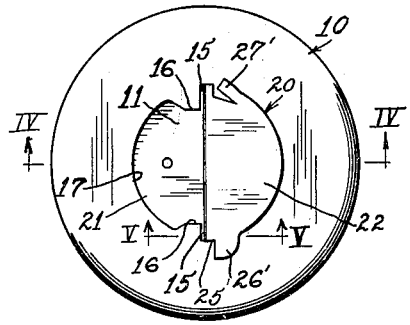
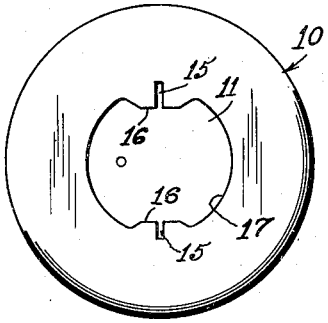
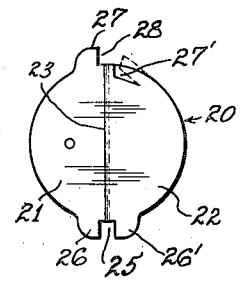
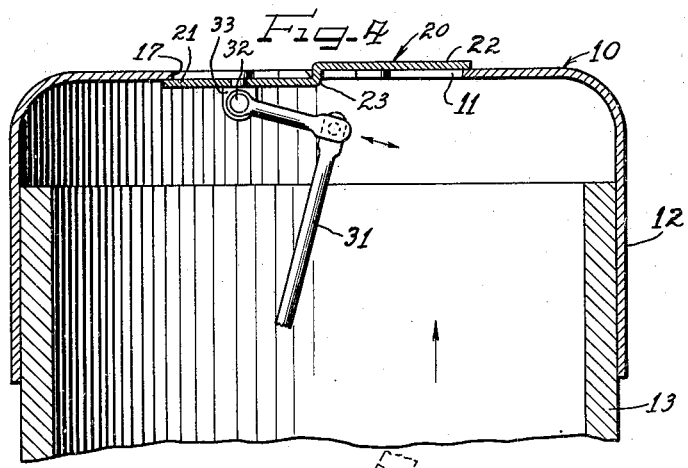
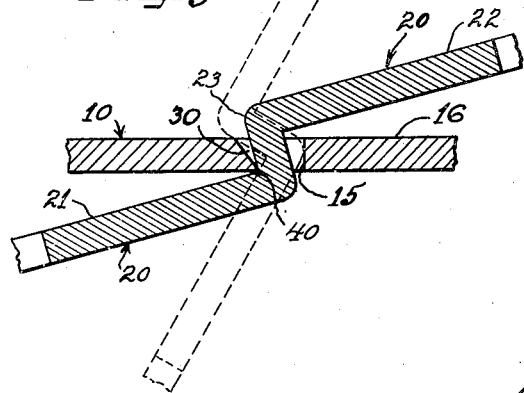
Inventor
Clyde A. Brown
by The Firm of Charles W. Hills Attys Patented Jan. 10, 1950

2,493,736

UNITED STATES PATENT OFFICE 2,493,736

SHAFTLESS BUTTERFLY VALVE

Clyde A. Brown, Chicago, Ill., assignor to The Dole Valve Company, Chicago, Ill., a corporation of Illinois Application April 5, 1946, Serial No. 659,744

10 Claims. (Cl. 251—11)

This invention relates to a butterfly type of valve and more particularly to a shaftless valve.

An object of this invention is to provide an improved but simple butterfly type of valve, which does not necessitate the use of any shafts or pins in order to pivotally support it on opposite edge portions of the valve opening.

Another object of this invention is to provide a butterfly type of valve which can have more effective sealing engagement with an edge of the valve opening when closed by fluid pressure or the like.

Still another object of this invention is to provide a shaftless valve which can have knife-like bearing supports at its diametrically opposite portions around diametrically opposite corners of slotted portions in the edge of a valve opening.

Yet another object of the invention is to provide a butterfly type of valve which can be easily unseated from closed position and moved to a partially open position, such, for example, as a 10% angular opening, with a minimum amount of bearing resistance.

Yet another and still further object of the invention is to provide a shaftless butterfly type of valve which can be economically fabricated from a metal stamping and which lends itself to economical installation in the edge portion of a valve opening without necessitating the use of any additional parts, such as pivots, pins, or the like.

A further object of the invention is to provide a two-part valve assembly; namely, an element defining a valve opening, and a butterfly type of valve, which may be assembled and interlocked together without the use of any additional pins.

In accordance with the general features of this invention there is provided in a valve assembly, a support element defining a valve opening with opposite edge portions provided with aligned slots, and a shaftless valve comprising offset planar wing portions joined by an intermediate section at an angle to the planes of said wing portions and disposed in a plane connecting the slots in the edge of the opening, the extremities of said intermediate section being arranged for knife-like pivotal bearing contact with said opposite portions of the opening edge adjacent the slots, and the wing portions being provided beyond said extremities with ears for holding the valve with its intermediate section in bearing contacts at its extremities with said element.

Another feature of the invention relates to making the offset wing portions of the valve of a greater overall area than that of the valve opening and so that one wing portion, when the valve is in closed position, will lap all of the edge of substantially one-half of the opening and the other wing portion will lap the remaining portion of the opening edge on an opposite side of the opening.

Yet another feature of the invention relates to the forming of one of the retaining ears from one of the wing portions in such a way that the valve can be inserted in opposite slots of the valve edge opening and whereby this ear can thereafter be deflected laterally to hold the valve in interlocked relation with the valve opening without necessitating the use of any additional parts or fastening elements.

Other objects and features of this invention will more fully appear from the following detailed description taken in connection with the accompanying drawings, which illustrate a single embodiment thereof, and in which Figure 1 is a plan view of a valve supporting element showing a valve opening with slots at each side and with the valve omitted;

Figure 2 is a plan view of a butterfly valve showing the condition of the valve prior to its association with the valve opening and illustrating by dotted lines how a retaining ear or lug can be deflected laterally from one of the valve wings to lock the valve in position when it is inserted in the slots of the supporting element;

Figure 3 is a plan view showing how the elements of Figures 1 and 2 are combined and interrelated to form a butterfly valve assembly embodying the features of this invention;

Figure 4 is an enlarged fragmentary cross-sectional view taken on substantially the line IV—IV of Figure 3 looking in the direction indicated by the arrows; and Figure 5 is an enlarged fragmentary cross-sectional view taken on substantially the line V—V of Figure 3, showing the valve in partially open position and illustrating by dotted lines how the valve can be swung to a completely open position.

As shown on the drawings:

The reference character 10 designates generally a valve supporting element and which has perforated in it a valve opening 11. This element 10 may be made from any suitable sheet or plate, such, for example, as metallic sheet and in reality comprises a simple stamping. Thus, it lends itself to economical manufacture on a large production scale.

The supporting element 10 may be suitably attached in any desirable manner to a conduit or structure through which fluid is flowing and which flow is to be controlled by the valve. For illustration in Figure 4, I have illustrated the element 10 as being cup-shaped and having an annular flange 12 suitably attached to a conduit 13 through which fluid, such as air, is adapted to flow upwardly.

My invention is not particularly concerned with the application of the valve but more specifically with the construction of the valve itself.

It will be perceived from Figure 1 that the valve opening 11 in the plate-like element 10 is divided into two halves at the junction of which are aligned slots 15—15 formed in diametrically opposite portions 16—16 of the edge 17 defining the valve opening 11. The slots 15 are not only diametrically opposite each other but are actually disposed in a straight line which defines generally the pivotal area of a valve designated generally by the reference character 20 (Figures 2 and 3).

This valve 20 may likewise comprise a metallic stamping and may be economically manufactured in suitable press equipment. It should be noted at this time that, consistent with the features of this invention, the butterfly valve assembly embodies only two parts 10 and 20. Also, by reason of the manner in which these parts are interrelated and interconnected no separate fastening elements or pivot pins are necessary. This interconnection will be described hereinafter.

The valve 20 comprises two laterally offset planar wing portions 21 and 22, which are connected together by an intermediate or junction section 23 at right angles to the planes of the wing portions 21 and 22 (Figures 4 and 5). The height of this intermediate section 23 is such that one planar portion 22 can be disposed on the top side of the valve opening 11 and the other one can be disposed on the bottom side of the valve opening, as shown in Figure 4. In addition, the over-all area of the valve 20, which is generally of a disc-like configuration with the exception of the attaching means, is such that when the valve is in closed position, as shown in Figure 4, it will completely lap all of the edge 17, defining the valve opening 11. In other words, the peripheral margin of the valve 20 extends beyond the edge 17 in sealing engagement with substantially one-half of the top side of the edge, and with substantially one-half of the lower side of the edge, to close off the flow of fluid.

At one extremity of the intermediate section 23 there is provided a slot 25 defined by a pair of peripheral ears 26—26'. This slot 25 is longitudinally aligned with the intermediate section 23.

At the other extremity of the intermediate section 23 is another ear 27, which corresponds identically with the ear 26 and is opposite the ear 26. This ear is notched out at 28 to define, in part, what is the equivalent of the slot 25. However, in order to enable the insertion of the valve edgewise through the slots 15—15 in a valve opening 10 this other extremity does not contain an ear corresponding to the ear 26'. Instead it is provided with a special ear 27' sheared from a wing flap 22 and adapted, after insertion of the valve in the supporting element, to be deflected to the dotted line position shown in Figure 2 corresponding to the full line position shown in Figure 3.

It should be noted that the intermediate section 23, which comprises a bend, has an over-all length substantially equal to the distance between the extremities of the ends of the two slots 15—15, as shown in Figures 1 and 3. In addition, the sheet material of the valve 20 is of a thickness slightly less than the width of the slots 15 so that the valve 20 can be inserted edgewise into slots 15—15 in the assembling of the valve.

In the actual assembling of the valve, the slot 25 of the valve element 20 is registered with our slot 15, and the extremity of the section 23 at the slot 25 is moved upwardly into the slot 15 of the supporting element. Then the flap 22 is moved bodily upward from the underside of the element 10 through the upper slot 15. It will be appreciated that this flap 22 can be freely moved through the upper slot 15 since at that time the ear 27' has not been deflected laterally out of the normal confines of the flap 22.

During the course of this insertion of the other end of the valve through the other slot 15, shown in Figures 1 and 3, the other extremity of the intermediate section 23 is passed through this other slot 15. In this manner, both extremities of the angular bend or junction section 23 are pivotally disposed in the two spaced slots 15—15 of the supporting element 10, as shown in Figure 3.

Thereafter the sheared tongue or ear 27' is deflected laterally outwardly so that it is disposed beyond the outer end of the cooperating slot 15, thus preventing the valve element from falling out of the support element 10. In this manner the valve element 20 is interconnected with and held on the supporting element 10. The element 20 is prevented from falling out of the slots 15—15 because the ears 26—26' and the ears 27—27' extend beyond the outermost extremities of the slots 15—15, and are adapted to contact the top and bottom sides of the plate-like supporting element 10. Accordingly the intermediate or turned section 23 is pivotally mounted in the slots 15—15 and is adapted to rock in the slots as best shown in Figure 5.

Attention is directed to the fact that the extent of the opening movement of the valve 20 may be increased by bevelling one side of each of the slots 15, as shown at 30 in Figure 5. This bevel is inclined outwardly away from the upstream side of the valve toward the down-stream; the up-stream side being on the inside of the element 10 (Figure 4).

When the valve is in closed position (as shown in Figure 4), the pressure of the fluid or air on the underside thereof tends to hold the valve in tight sealing engagement with the element 10. In this respect it should be noted that all of the valve wing or flap 21 is exposed to the pressure of the fluid, whereas only a portion of the wing 22, exposed through one-half of the valve opening, is exposed to that pressure. As a consequence, the flap 21 is forced upward tightly against the bottom side of the supporting plate 22.

Any suitable means may be employed for opening the valve. For illustration, a lever arm assembly 31 may be pivotally connected at 32 to the underside of the valve wing or flap 21. To effect this connection, the wing 21 may have attached to it and depending downward therefrom a bracket 33, which carries the pivot pin 32.

In practice the lever arm assembly 31 may be connected to a suitable motivating means, such, for example, as a thermostatic coil (not shown) or the like. It is, of course, to be understood that this valve is not limited in its application to use with either liquid or gas, and may be adapted for use in the flow of fluid in either direction as desired.

The valve 20 can be moved to open position by the actuating lever 31, which results in the rocking of the valve into a partially opened position, as shown in full line in Figure 5. The continued operation of the lever 31 further opens the valve until the valve is moved to a full open position, as shown by dotted lines in Figure 5.

Due to the fact that no pivot pins or shafts are used, the friction exerted on the valve by the pivots thereof is reduced to a minimum. In other words, the angular intermediate section 23 has only aligned contacts with the edges of the diametrically opposite slots 15, as shown, for example, at 40 in Figure 5. This is particularly true in the initial opening stages of the valve so that as the valve pivots around the inside corners of the edges of the slots 15—15, relatively little resistance is afforded to the unseating and opening of the valve.

This is important when one realizes that, for example, during a 10% angular opening, there is only 30 to 40% of the flow of the fluid through the valve opening 10 so that the balance of the fluid flow is still exerting pressure against the valve, tending to close it. It is very desirable for this reason during the initial opening movement to make it very easy for the valve to be pivotally moved. Obviously, aligned contacts, such as the contacts 40, facilitate such opening movement.

As the valve is moved from a 10 to 20% opening position more of the angular intermediate section 23 is caused to rock on the bevelled inclined ends of each of the slots 15—15.

In addition with the knife-like edge contacts 40 in the two slots 15—15, it is possible when the valve is moved to closed position to obtain practically 100% sealing of the edge of the valve against the cooperating edge portions of the valve opening.

The present valve has been particularly designed for use in a water pressure system, such as in an automobile where a thermostat is employed to control the opening of the valve when the water reaches a pre-determined temperature. It is very desirable in such systems, as is well known, to maintain the valve in a tightly sealed condition when it is closed, and yet to open it easily and quickly when the temperature rises sufficiently to operate the valve through the thermostat.

I claim as my invention:

1. In a valve structure including a substantially flat supporting plate having an edge defining a valve opening, a shaftless valve comprising offset planar portions joined by an intermediate section at an agle to the planes of said portions and defining diametrically opposite bearing surfaces in supporting knife-like contact with opposite portions of said opening edge and affording a pivotal support of the valve on said edge with said offset planar portions in lapping engagement with opposite sides of said plate to close said opening when the valve is in closed position.

2. In a valve structure including a substantially flat supporting plate having an edge defining a valve opening, a shaftless valve comprising offset planar portions joined by an intermediate section at an angle to the planes of said portions and defining diametrically opposite bearing surfaces in supporting knife-like contact with opposite portions of said opening edge for pivotally supporting said valve on said edge with said offset planar portions in lapping engagement with opposite sides of said plate to close said opening when the valve is in closed position, said planar portions extending beyond the extremities of said intermediate section and being slotted beyond said bearing surfaces, and said opening being slotted opposite the slots in the planar portions for the mounting of said valve in pivotal engagement with the edge of the opening.

3. In a valve structure including a substantially flat supporting plate having an edge defining a valve opening, a shaftless valve comprising offset planar portions joined by an intermediate section at an angle to the planes of said portions and defining diametrically opposite bearing surfaces for supporting knife-like contact with opposite portions of said opening edge whereby the valve is pivotally supported on said edge, said planar portions extending beyond the extremities of said intermediate section and being slotted beyond said bearing surfaces, and said opening edge being slotted opposite the slots in the planar portions for the mounting of said valve in pivotal engagement with the edge of the opening, the edges of said planar portions lapping opposite sides of said plate beyond the edge of the valve opening in sealing engagement with opposite sides of the plate.

4. In a valve assembly including a supporting plate-like portion having a valve opening defined by an edge diametrically opposite portions of which are provided with aligned slots and a shaftless valve comprising laterally offset wing portions joined by an intermediate section at an angle to the planes of said portions and in a plane passing through said slots, said wing portions being slotted at the opposite ends of said intermediate section for insertion in the slots of said plate and having ears at the diametrically opposite ends of said intermediate section for holding said intermediate section in pivotal aligned contact with said valve edge adjacent its opposite slots.

5. In a valve assembly including a supporting plate-like portion having a valve opening defined by an edge diametrically opposite portions of which are provided with aligned slots and a shaftless valve comprising laterally offset wing portions joined by an intermediate section at an angle to the planes of said portions and in a plane passing through said slots, said wing portions being slotted at the opposite ends of said intermediate section for insertion in the slots of said plate and having ears at the diametrically opposite ends of said intermediate section for holding said intermediate section in pivotal aligned contact with said valve edge adjacent its opposite slots, said wing portions together being of an over-all size larger than said opening with one offset wing portion engaging substantially a half of said opening on one side of the supporting portion and with the other wing portion engaging the remaining half of the edge of the valve opening on the opposite side of the portion so that said valve when in closed position completely laps all of the edge of said opening to close the same.

6. In a valve assembly, an element defining a valve opening having an edge thereof provided with diametrically opposite slots and a shaftless valve of an overall size larger than said opening and having end extremities inserted through said slots with diametrically opposite portions aligned with said slots and in aligned bearing contact with the portions of the edge of the opening, said contacts defining a pivotal connection between the valve and the element.

7. In a valve assembly, an element defining a valve opening having the edge thereof provided with diametrically opposite slots and a shaftless valve of an overall size larger than said opening and having end extremities inserted through said slots with diametrically opposite portions aligned with said slots and in aligned bearing contact with the portions of the edge of the opening, said contacts defining a pivotal connection between the valve and the element, said valve including offset wing portions joined by an angular intermediate section providing at its ends said aligned bearing contact portion, and said wing portions being disposed on opposite sides of said element for lapping engagement with the edge of said opening to completely close the same when the valve is in closed position.

8. In a valve structure, a supporting member defining a valve opening having the edge thereof provided with diametrically opposite slots, and a shaftless valve closure element for said opening and comprising offset planar wing portions, an angular intermediate section joining said portions and in a plane passing through said slots for pivotal cooperation therewith, and ears extending laterally from opposite edges of said portions adjacent said slots to retentionally hold said element in said slots, one of said ears being deflectable laterally from one of said portions after mounting said element in said slots.

9. In a valve structure including a supporting member defining a valve opening having the edge thereof provided with diametrically opposite slots defining knife-like edges, a shaftless valve closure element for said opening and comprising offset planar wing portions and an angular intermediate section connecting said portions, said element having diametrically opposite recesses laterally beyond said valve opening and said intermediate section having its extremities radially inward of said recesses and in a plane passing through said slots so as to pivotally engage said knife-like edges of said slots in the support of the valve element on said member.

10. In a valve structure having a member provided with a valve opening defined by an edge having diametrically opposite slots, a shaftless valve closure element for said opening comprising diametrically opposite offset planar wing portions for engaging opposite sides of said member around said opening, and an intermediate section at an angle to and connecting said wing portions together, said element being recessed at diametrically opposite extremities of said intermediate section with said extremities engageable in said slots for knife-like pivotal contact with edge portions of said slots.

CLYDE A. BROWN.

REFERENCES CITED

The following references are of record in the file of this patent:

UNITED STATES PATENTS

| Number | Name | Date |
|---|---|---|
| 1,064,061 | Dyblie | June 10, 1913 |
| 1,228,738 | Barbarou | June 5, 1917 |
| 1,282,112 | Oettinger | Oct. 22, 1918 |